United States Patent [19]

Saito

[11] Patent Number: 4,728,689

[45] Date of Patent: Mar. 1, 1988

[54] OPTIONALLY AND PARTIALLY SALIFIED POLYSTYRENE-SULFONIC ACID AS ANTISTATIC AGENT

[76] Inventor: Norio Saito, No. 1019 Shimizudani, Takatori-cho, Takaichi-gun, Nara-ken, Japan

[21] Appl. No.: 928,358

[22] Filed: Nov. 10, 1986

[30] Foreign Application Priority Data

Nov. 15, 1985 [JP] Japan .................................. 60-257355

[51] Int. Cl.$^4$ .......................... C08L 75/00; B05D 3/02
[52] U.S. Cl. .................................... 524/507; 524/521; 524/523; 524/911; 525/212; 427/393.5

[58] Field of Search ............... 524/507, 521, 523, 910, 524/911, 912; 525/212

[56] References Cited

U.S. PATENT DOCUMENTS 4,640,793  2/1987  Persinski et al. .................... 525/212

*Primary Examiner*—Joseph L. Schofer
*Assistant Examiner*—Peter D. Mulcahy

[57] ABSTRACT

An antistatic composition which essentially consists of (1) optionally and partially salified polystyrenesulfonic acid; (2) acrylic or urethane resin; and (3) aqueous and organic solvents.

1 Claim, No Drawings

OPTIONALLY AND PARTIALLY SALIFIED POLYSTYRENE-SULFONIC ACID AS ANTISTATIC AGENT

The present invention relates to an antistatic composition which comprises as an antistatic agent optionally and partially salified polystyrenesulfonic acid.

Plastic materials are poor electrical conductors and apt to be charged by abrasion. Charged plastic materials are difficult to handle in the process of "processing" and tend to attract dust. Accordingly, for the purpose of overcoming such drawbacks possessed by the plastic materials, various antistatic agents have been developed and put to practical use. Among them, however, only a few have satisfactory properties in terms of compatibility and adherability to plastic materials, heat stability, non-toxicity to a human body, and antistatic effect.

The inventor of the present invention previously found that a metal salt of an arylsulfonic acid selected from the group consisting of dodecylbenzenesulfonic acid, tridecylbenzenesulfonic acid and polystyrenesulfonic acid exhibits an excellent antistatic action. (See Japanese Patent Publication (Kokai) No. 147073/1984). The metal salts of the arylsulfonic acids have been put to practical use and gained a good reputation among those skilled in the art.

During extended study on the metal salts, particularly polystyrenesulfonate, it has surprisingly been found that both polystyrenesulfonic acid and said acid which has been partially salified are superior to the metal salt of the acid, i.e., completely salified acid, in terms of antistatic effect. The present invention is based on such finding. Polystyrenesulfonic acid and partially salified polystyrenesulfonic acid are hereinafter collectively referred to as "optionally and partially salified polystyrenesulfonic acid", or "the polystyrenesulfonic acid of the invention", or "the acid of the invention" for the purpose of simplicity.

The polystyrenesulfonic acid of the invention is usually employed in the form of a composition which essentially consists of (1) said acid as an antistatic agent; (2) acrylic or urethane resin as a coating resin; and (3) aqueous and organic solvents as a medium or diluent.

Thus, the present invention provides an antistatic compositon which essentially consists of (1) optionally and partially salified polystyrenesulfonic acid; (2) acrylic or urethane resin; and (3) aqueous and organic solvents.

The invention also provides the use of said polystyrenesulfonic acid as an antistatic agent.

The polystyrenesulfonic acid of the invention which carries only free sulfonic acid group may be prepared by dissolving polystyrene in an appropriate organic solvent such as chlorinated hydrocarbons and bubbling sulfuric anhydride into the resultant solution at temperature below 50° C. until desired degree of sulfonation is attained. After removal of excessive sulfuric anhydride by bubbling air into the reaction mixture, polystyrenesulfonic acid is extracted with water. The resulting aqueous solution is concentrated, if necessary, to obtain an aqueous solution containing about 35% by weight of polystyrenesulfonic acid. The aqueous solution containing 35% by weight of polystyrenesulfonic acid per se can be employed for preparation of the antistatic composition of the invention.

The aqueous polystyrenesulfonic acid solution gives a solid powder when evaporated to dryness. The obtained polystyrenesulfonic acid in the form of a solid powder is readily soluble in water but sparingly soluble in most of organic solvents. However, the solid can be dissolved in alcohols although it takes a long period of time.

The preferred polystyrenesulfonic acid employed in the present invention has a molecular weight ranging from about 4,000 to 20,000, and a sulfonation degree of about 40 to 90%.

Partially salified polystyrenesulfonic acid of the invention may be prepared by adding an appropriate base to the aqueous polystyrenesulfonic acid solution mentioned above and removing the solvent under reduced pressure. Preferably, the base is added in an amount of 1/5 to 4/5 mole equivalent in terms of sulfonic acid groups in the polystyrenesulfonic acid. Illustrative bases employed in the present invention are organic bases such as pyridine and methylamine, inorganic bases such as aluminum salt (e.g. $Al_2O(CH_3COO)_44H_2O$), ferric salt (e.g. $FeCl_3$) and zinc salt (e.g. $Zn(CH_3COO)_22H_2O$), and ammonia.

The optionally and partially salified polystyrenesulfonic acid of the invention in the form of an aqueous solution is admixed with (1) a coating material such as acrylic or urethane resin, which is usually handled in the form of an organic solution, and (2) an appropriate organic solvent to obtain an antistatic composition of the invention. The antistatic composition can be applied to the surface of various plastic materials by techniques well known in the art, whereby plastic materials having improved antistatic effect is obtained.

The antistatic composition of the invention can be applied to plastic materials by any of various conventional procedures such as coating, dipping, spraying, and incorporating methods. The plastic materials to be treated by the composition of the invention include any resin and fiber composed of nylon, polyester, polyethylene, polypropylene, polyvinyl chloride, polyacrylate, polyether, etc.

The following detailed examples are presented by way of illustration of certain specific embodiments of the invention.

EXAMPLE 1

Polystyrenesulfonic acid

Polystyrene (104 g) having average molecular weight of 5,500 was dissolved in tetrachloroethane (1,000 ml). Sulfuric anhydride (80 g) was then bubbled into the resultant solution at temperature below 50° C. over 3 hours. Subsequently, dried air was bubbled into the reaction mixture for 2 hours to remove non-reacted sulfuric anhydride, and polystyrenesulfonic acid was extracted with water (550 ml). A 35.2% aqueous polystyrenesulfonic acid solution (520 ml) was, thus obtained. The degree of sulfonation was found to be 89.2% according to the Sulfate Test provided in General Test and Assay, Japanese Pharmacopoeia.

An aliquot of the solution obtained above was evaporated to dryness under reduced pressure to give polystyrenesulfonic acid in the form of yellowish red mass of solid. This solid is readily soluble in water and sparingly soluble in benzene and toluene. It dissolves in alcohols after a long period of time. Decomposition point: 270° C.

EXAMPLE 2

Methylamine polystyrenesulfonate

Methylamine hydrochloride (2.5 g) was added to the polystyrenesulfonic acid solution obtained in Example 1 (100 g), and the mixture was concentrated at temperature below 60° C. under reduced pressure to obtain methylamine polystyrenesulfonate (31.5 g) as a solid residue. Free sulfonic acid groups content: 78.3%. Decomposition point: 270° C.

EXAMPLE 3

Aluminum polystyrenesulfonate

Basic aluminum acetate $[Al_2O(CH_3COO)_4 4H_2O]$ (5.0 g) was added to the polystyrenesulfonic acid solution (100 g), and the mixture was concentrated at temperature below 60° C. under reduced pressure to obtain the titled compound (32.1 g) as a yellowish red solid residue. Free sulfonic acid groups content: 50.0%. Decomposition point: 270° C.

EXAMPLE 4

Nickel polystyrenesulfonate

Nickel cabonate $[NiCO_3 2Ni(OH)_2 4H_2O]$ (5.3 g) was added to the polystyrenesulfonic acid solution (100 g), and the mixture was concentrated at temperature below 60° C. under reduced pressure to obtain the titled compound (33.0 g) as a bluish green solid residue. Free sulfonic acid groups content: 50.0%. Decomposition point: 270° C.

EXAMPLE 5

Zinc polystyrenesulfonate

Zinc acetate $[Zn(CH_3COO)_2 2H_2O]$ (9.0 g) was added to the polystyrenesulfonic acid solution (100 g), and the mixture was concentrated at temperature below 60° C. under reduced pressure to obtain the titled compound (34.0 g) as a yellow solid residue. Free sulfonic acid groups content: 52.0%. Decomposition point: 270° C.

Experiment 1

Antistatic compositions of the invention were prepared by mixing the polystyrenesulfonic acid solution obtained in Example 1, an acrylic resin solution (LR-117, Mitsubishi Jushi Co., Ltd.) and/or an urethane resin solution (Takerack-E-365, Takeda Pharmaceutical Co., Ltd.) and isopropylalcohol according to the formulation shown in

TABLE 1

| Sample No. | PSS | IPA | E-365 | LR-117 |
|---|---|---|---|---|
| I | 17.1 | 73.0 | 5.0 | 0 |
| II | 25.6 | 71.9 | 0 | 6.0 |
| III | 25.6 | 67.9 | 4.0 | 2.5 |
| IV | 25.6 | 71.0 | 2.0 | 1.4 |
| V | 25.6 | 61.4 | 8.0 | 5.0 |

Note:
PSS: 35% (w/w) aqueous polystyrenesulfonic acid solution
IPA: isopropylalcohol
E-365: urethane resin solution containing 25% by weight of the resin and 75% by weight of the mixture of alcohol and toluene
LR-117: acrylic resin solution containing 40% by weight of acrylic resin and the mixture of alcohol and toluene.

Each of the resultant composition (Sample Nos. I, II, III, IV and V) was applied to a vinyl resin plate, and electrical resistance of the plate, which reflects antistatic effect of the composition, was measured using a static onestometer (applied voltage: 2,000 V) and an ultra isulating needle SM10E (Tooa Denpa, applied voltage: 10 V· 500 V) at 23° C., 50% RH. A similar composition which does not contain the polystyrenesulfonic acid solution was also applied to the plate, and electric resistance of the treated plate was measured as a control. The experimental results are given in Table 2.

TABLE 2

| Sample No. | | $Rs(\Omega)$ | | $Rv(\Omega)$ | | Onestometer charged voltage (Kv) | half-life (second) |
|---|---|---|---|---|---|---|---|
| | | 10 V | 500 V | 10 V | 500 V | | |
| I | face | $1.2 \times 10^7$ | $<1 \times 10^6$ | $7.0 \times 10^7$ | $<1.5 \times 10^7$ | 0 | 0 |
| | reverse | $9.0 \times 10^6$ | $<1 \times 10^6$ | | | | |
| II | face | $1.2 \times 10^7$ | $<1 \times 10^6$ | $4.0 \times 10^7$ | $<1.5 \times 10^7$ | 0 | 0 |
| | reverse | $1.2 \times 10^7$ | $<1 \times 10^6$ | | | | |
| III | face | $<1 \times 10^6$ | $<1 \times 10^6$ | $<1.5 \times 10^7$ | $<1.5 \times 10^7$ | 0 | 0 |
| | reverse | $<1 \times 10^6$ | $<1 \times 10^6$ | | | | |
| IV | face | $5.4 \times 10^6$ | $1 \times 10^6$ | $2.0 \times 10^7$ | $<1.5 \times 10^7$ | 0 | 0 |
| | reverse | $4.0 \times 10^6$ | $1 \times 10^6$ | | | 0 | 0 |
| V | face | $6.6 \times 10^6$ | $1 \times 10^6$ | $2.2 \times 10^7$ | $1.5 \times 10^7$ | 0 | 0 |
| | reverse | $6.6 \times 10^6$ | $1 \times 10^6$ | | | 0 | 0 |
| Control | face | $5.4 \times 10^{16}$ | — | — | — | — | — |
| | reverse | $5.4 \times 10^{16}$ | — | | | | |

Rs: plane resistance
Rv: solid resistance

Table 2 shows that the electric resistance of each of the plates treated with the composition of the invention is very low compared with that of the control. Thus, the composition of the invention exhibits an excellent antistatic effect.

Experiment 2

The method of Experiment 1 was repeated except that the composition of the invention (Sample No. V) was applied to a variety of plastic materials. The test results are shown in Table 3. In the table, "Rv=∞" indicates that measurement was over the measurable limit and "Charged voltage=0" denotes that measurement was below the measurable limit.

TABLE 3

| Plastic materials No. | | $Rs (\Omega)$ | | $Rv (\Omega \cdot cm)$ | | Onestometer charged voltage (Kv) | half-life (second) |
|---|---|---|---|---|---|---|---|
| | | 10 V | 500 V | 10 V | 500 V | | |
| PE | 1 | $6.6 \times 10^7$ | $<3 \times 10^8$ | ∞ | ∞ | 0 | 0 |
| | 2 | $5.4 \times 10^7$ | $<3 \times 10^8$ | ∞ | ∞ | 0 | 0 |
| | 3 | $6.6 \times 10^7$ | $<3 \times 10^8$ | ∞ | ∞ | 0 | 0 |

TABLE 3-continued

| Plastic materials No. | | Rs (Ω) 10 V | Rs (Ω) 500 V | Rv (Ω·cm) 10 V | Rv (Ω·cm) 500 V | Onestometer charged voltage (Kv) | Onestometer half-life (second) |
|---|---|---|---|---|---|---|---|
| | 4 | $7.8 \times 10^7$ | $<3 \times 10^8$ | ∞ | ∞ | 0 | 0 |
| AC (transparent) | 1 | $8.4 \times 10^7$ | $<3 \times 10^8$ | ∞ | ∞ | 0 | 0 |
| | 2 | $1.1 \times 10^8$ | $<3 \times 10^8$ | ∞ | ∞ | 0 | 0 |
| | 3 | $2.4 \times 10^8$ | $<3 \times 10^8$ | ∞ | ∞ | 0 | 0 |
| | 4 | $9.0 \times 10^7$ | $<3 \times 10^8$ | ∞ | ∞ | 0 | 0 |
| AC (non-transparent) | 1 | $9.0 \times 10^7$ | $<3 \times 10^8$ | ∞ | ∞ | 0 | 0 |
| | 2 | $1.1 \times 10^8$ | $<3 \times 10^8$ | ∞ | ∞ | 0 | 0 |
| | 3 | $8.4 \times 10^7$ | $<3 \times 10^8$ | ∞ | ∞ | 0 | 0 |
| | 4 | $1.2 \times 10^8$ | $<3 \times 10^8$ | ∞ | ∞ | 0 | 0 |
| ABS | 1 | $9.0 \times 10^7$ | $<3 \times 10^8$ | ∞ | ∞ | 0 | 0 |
| | 2 | $1.1 \times 10^8$ | $<3 \times 10^8$ | ∞ | ∞ | 0 | 0 |
| | 3 | $9 \times 10^7$ | $<3 \times 10^8$ | ∞ | ∞ | 0 | 0 |
| | 4 | $8.4 \times 10^7$ | $<3 \times 10^8$ | ∞ | ∞ | 0 | 0 |
| PC | 1 | $3.3 \times 10^7$ | $<3 \times 10^8$ | ∞ | ∞ | 0 | 0 |
| | 2 | $4.2 \times 10^7$ | $<3 \times 10^8$ | ∞ | ∞ | 0 | 0 |
| | 3 | $3.6 \times 10^7$ | $<3 \times 10^8$ | ∞ | ∞ | 0 | 0 |
| | 4 | $4.2 \times 10^7$ | $<3 \times 10^8$ | ∞ | ∞ | 0 | 0 |
| PS | 1 | $6.0 \times 10^7$ | $<3 \times 10^8$ | ∞ | ∞ | 0 | 0 |
| | 2 | $8.1 \times 10^7$ | $<3 \times 10^8$ | ∞ | ∞ | 0 | 0 |
| | 3 | $9.0 \times 10^7$ | $<3 \times 10^8$ | ∞ | ∞ | 0 | 0 |
| | 4 | $1.5 \times 10^8$ | $<3 \times 10^8$ | ∞ | ∞ | 0 | 0 |
| PP | 1 | $7.8 \times 10^7$ | $<3 \times 10^8$ | ∞ | ∞ | 0 | 0 |
| | 2 | $7.2 \times 10^7$ | $<3 \times 10^8$ | ∞ | ∞ | 0 | 0 |
| | 3 | $7.2 \times 10^7$ | $<3 \times 10^8$ | ∞ | ∞ | 0 | 0 |
| | 4 | $6.6 \times 10^7$ | $<3 \times 10^8$ | ∞ | ∞ | 0 | 0 |

RE: polyethylene
AC: polyacrylate
ABS: acrylonitrile-butadiene-styrene copolymer
PC: polycarbonate
PS: polystyrene
PP: polypropylene Table 3 distinctly shows that the composition of the present invention confers an excellent antistatic effect on all kinds of plastic materials.

Experiment 3

Each of the partially salified polystyrenesulfonic acids prepared in Examples 2 to 5 was used to prepare the composition of the invention according to the formulation shown in Table 4. The obtained compositions (Sample No. 1 to 4) were each applied to a polyvinyl chloride plate and respective electric resistances of the treated plates were measured in the same manner as described in Experiment 1. Table 5 lists the test results and shows that the partially salified polystyrenesulfonic acid of the invention also exhibits a remarkable antistatic effect.

TABLE 4

| Partially salified sulfonic acid | PSSS | LR-117 | IPA | water |
|---|---|---|---|---|
| 1. according to Example 2 | 50 | 100 | 100 | 50 |
| 2. according to Example 3 | 50 | 100 | 150 | 50 |
| 3. according to Example 4 | 50 | 100 | 150 | 50 |
| 4. according to Example 5 | 50 | 100 | 150 | 50 |

PSSS: partially salified polystyrenesulfonic acid

TABLE 5

| Sample No. | Rs (Ω) 10 V | Rs (Ω) 500 V | RV (Ω) 10 V | RV (Ω) 500 V | Onestometer charged voltage (Kv) | Onestometer half-life (second) |
|---|---|---|---|---|---|---|
| 1 | $5.8 \times 10^9$ | $1 \times 10^8$ | $7.2 \times 10^{10}$ | $2.5 \times 10^9$ | 0 | 0 |
| 2 | $8.4 \times 10^{10}$ | $1 \times 10^9$ | $4.0 \times 10^{11}$ | $1.5 \times 10^{10}$ | 0 | 0 |
| 3 | $6.0 \times 10^{11}$ | $1 \times 10^{10}$ | $2.0 \times 10^{11}$ | $1.5 \times 10^{10}$ | 0 | 0 |
| 4 | $7.2 \times 10^9$ | $1 \times 10^8$ | $4.3 \times 10^{10}$ | $6.8 \times 10^9$ | 0 | 0 |

What is claimed is:

1. A method for imparting antistatic properties to a plastic material comprising the step of applying a composition which consists essentially of (1) optionally and partially salified polystyrene-sulfonic acid selected from the group consisting of polystyrenesulfonic acid and partially salified polystyrenesulfonic acid; (2) acrylic or urethane resin; and (3) aqueous and organic solvents.

* * * * *